US012558989B2

(12) United States Patent
King, Jr.

(10) Patent No.: US 12,558,989 B2
(45) Date of Patent: Feb. 24, 2026

(54) INTEGRATED MULTI-PORT ELECTRIC VEHICLE (EV) CHARGING SYSTEM

(71) Applicant: Siemens Industy, Inc., Alpharetta, GA (US)

(72) Inventor: William A. King, Jr., Loganville, GA (US)

(73) Assignee: Siemens Industy, Inc., Alpharetta, GA (US)

( * ) Notice: Subject to any disclaimer, the term of this patent is extended or adjusted under 35 U.S.C. 154(b) by 697 days.

(21) Appl. No.: 18/065,183

(22) Filed: Dec. 13, 2022

(65) Prior Publication Data
US 2024/0190286 A1     Jun. 13, 2024

(51) Int. Cl.
| | |
|---|---|
| B60L 53/68 | (2019.01) |
| B60L 53/16 | (2019.01) |
| B60L 53/18 | (2019.01) |
| B60L 53/66 | (2019.01) |
| B60L 53/67 | (2019.01) |

(52) U.S. Cl.
CPC .............. B60L 53/68 (2019.02); B60L 53/16 (2019.02); B60L 53/18 (2019.02); B60L 53/66 (2019.02); B60L 53/67 (2019.02)

(58) Field of Classification Search
CPC .......... B60L 53/68; B60L 53/67; B60L 53/66; B60L 53/16; B60L 53/18
USPC ........................................................ 320/109
See application file for complete search history.

(56) References Cited

U.S. PATENT DOCUMENTS

| | | | | |
|---|---|---|---|---|
| 10,778,008 | B2 * | 9/2020 | Levy ...................... | H02J 13/00 |
| 2013/0179061 | A1 * | 7/2013 | Gadh .................... | B60L 53/305 |
| | | | | 701/1 |
| 2014/0062401 | A1 | 3/2014 | Gadh et al. | |
| 2017/0088001 | A1 | 3/2017 | Haas et al. | |
| 2017/0164179 | A1 * | 6/2017 | Jeon .................... | H04W 40/244 |

FOREIGN PATENT DOCUMENTS

WO       2013019989 A2     2/2013

* cited by examiner

*Primary Examiner* — Nathaniel R Pelton

(57) ABSTRACT

A multi-port charging system is provided for charging a rechargeable battery pack that solely propels a plug-in electric vehicle (EV). The system comprises a smart EV charging station including a single network gateway as an entire system communication portion of the multi-port charging system and a single charging system controller as an entire system controller portion of the multi-port charging system. The system further comprises at least two or expandable to greater than two charge ports electrically coupled to the smart EV charging station. Each charge port includes only a charging portion but not a system communication portion and a system controller portion. Each charge port includes a metering circuit to track an amount of electric energy delivered to an EV and collect metered energy data and send the metered energy data back to the smart EV charging station. Each charge port includes one or more EV connection plugs.

20 Claims, 9 Drawing Sheets

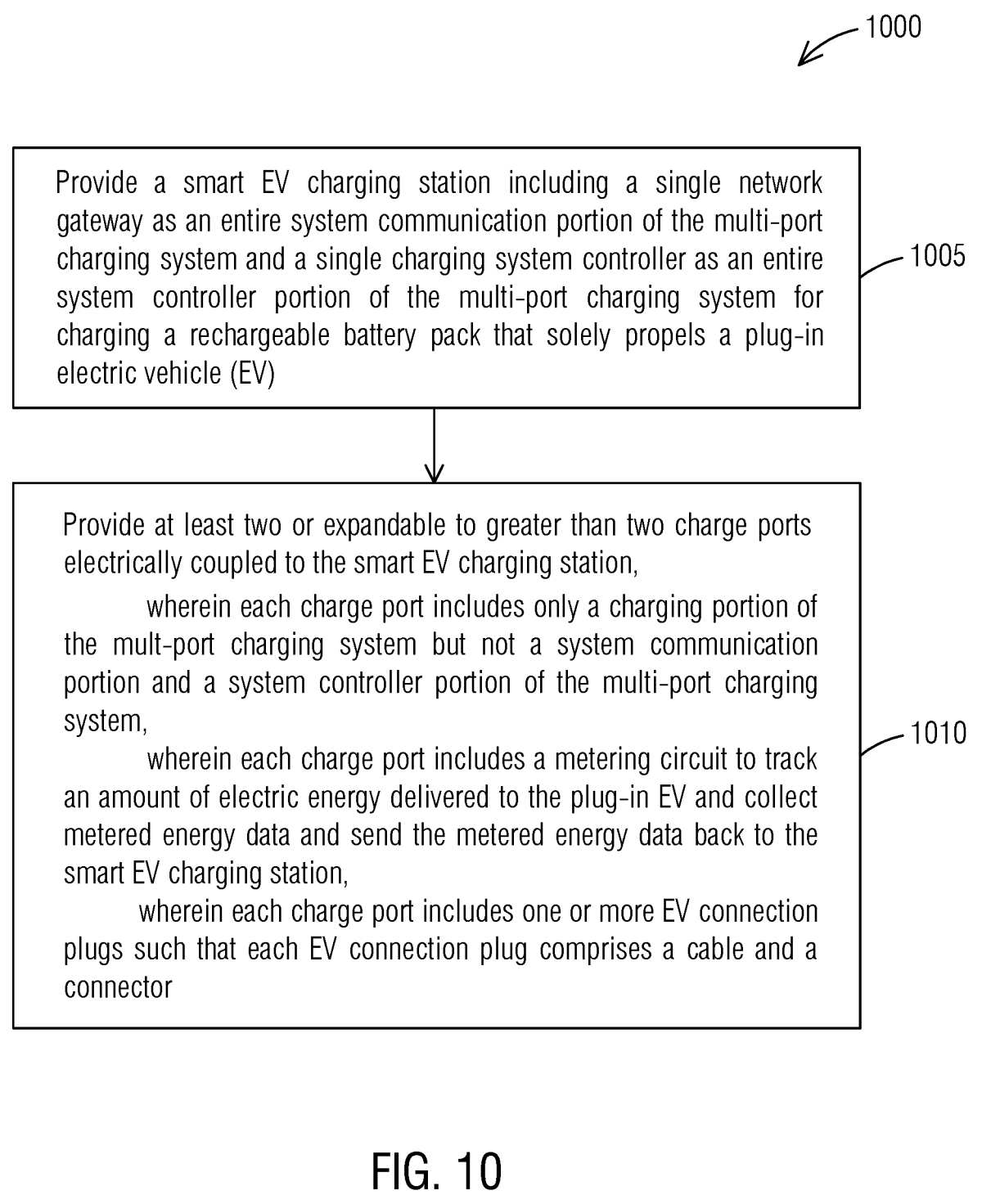

1000

1005

Provide a smart EV charging station including a single network gateway as an entire system communication portion of the multi-port charging system and a single charging system controller as an entire system controller portion of the multi-port charging system for charging a rechargeable battery pack that solely propels a plug-in electric vehicle (EV)

1010

Provide at least two or expandable to greater than two charge ports electrically coupled to the smart EV charging station, wherein each charge port includes only a charging portion of the mult-port charging system but not a system communication portion and a system controller portion of the multi-port charging system, wherein each charge port includes a metering circuit to track an amount of electric energy delivered to the plug-in EV and collect metered energy data and send the metered energy data back to the smart EV charging station, wherein each charge port includes one or more EV connection plugs such that each EV connection plug comprises a cable and a connector

FIG. 10

INTEGRATED MULTI-PORT ELECTRIC VEHICLE (EV) CHARGING SYSTEM

BACKGROUND

1. Field

Aspects of the present invention generally relate to an integrated multi-port electric vehicle (EV) charging system.

2. Description of the Related Art

Unlike gas-powered vehicles, electric vehicles (EVs) do not require internal combustion engines to operate. Outfitted with an electric motor and a rechargeable battery pack. EVs move along our roadways without burning up gasoline, or producing harmful exhaust emissions, while generating less noise pollution. The world of transportation continues to rapidly evolve. Sales of electric vehicles (EVs) are expected to expand rapidly in the US in the coming years. Economics aside, there are growing social and political initiatives toward "clean" energy that will push this to become reality. A number of market forecasts indicate electric vehicles will account for nearly 1 in 5 of all vehicles sold within the next 10 years. It is estimated approximately 3 million EVs will be sold in the US in 2028. A rule of thumb by industry analysts is there need be on the order of 20 public EVC stations per EV on the road to support the ecosystem. There were just over 60,000 charging stations in the US at the end of 2019. Thus, tens of thousands will need to be deployed every year for some time as the market grows.

Charging stations have provided hundreds of millions of charges to EV (electric vehicle) drivers worldwide. When it comes to electric vehicles, the converter is built inside the car. It's called the "onboard charger" though it really is a converter. It converts power from AC to DC and then feeds it into the car's battery. This is the most common charging method for electric vehicles today and most chargers use AC power.

An EV is connected to AC power. 120V or 240V, and a battery charger in the EV converts the AC power to the DC needed to charge the battery and controls the charging process. In DCFC the DCFC converts the AC power to DC and the DC power is sent directly to the EV battery bypassing the onboard battery charger. There are three categories or types of charging: Trickle Charge, AC Charge and DC Charge. Most drivers of electric vehicles (EVs)—which include all-electric vehicles and plug-in hybrid electric vehicles (PHEVs)—charge their vehicles overnight at home using AC Level 1 or AC Level 2 charging equipment.

A charging station, also known as a charge point or electric vehicle supply equipment (EVSE), is a piece of equipment that supplies electrical power for charging plug-in electric vehicles (including electric cars, electric trucks, electric buses, neighborhood electric vehicles, and plug-in hybrids). There are two main types: AC charging stations and DC fast chargers. Batteries can only be charged with direct current (DC) electric power, while most electricity is delivered from the power grid as alternating current (AC). For this reason, most electric vehicles have an onboard charger with an AC-to-DC converter (a rectifier). At an AC charging station, power is supplied to the onboard charger.

The majority, if not all, of the charging stations have a charging function where the device has either a relay contact or some switch mechanism. A charging system can be a level 2 charging system. A charging station or an enclosure has the means to charge the EV, but it also has a communications means to communicate with a controller. For example, for authorization or to send metering information on how much energy was used. All of this function is built into every single charging station unit that's installed.

Basically either dual or quad type charging stations on one mount have been implemented, but then the issue one runs into is that the cabling has to be very long. It is not the best solution.

A gateway being the communication means can communicate with the cloud and get information on what the charging rates are and send information to the cloud on metering. A gateway is present in every one of today's charging stations right now such as even the level 2 AC charging stations can communicate with the cloud. But that adds a lot of cost to every charging session.

The power companies that are providing power to EVs in the cities are going from one car or two cars on a block that are electric to having 15 cars on a block that are electric. So there needs to be a way to control it such that these charging stations could deliver power to EVs in the future.

Therefore, there is a need for a charging system that can optimally charge a large number of EVs in a close vicinity.

SUMMARY

Briefly described, aspects of the present invention relate to a multi-port electric vehicle (EV) charging system that can control multiple charge ports so instead of having a smart charging station in front of every parking space a lower cost charging port is provided in front of every couple of parking spaces and then the charging port can communicate back to a local kiosk with a smart charging station and it might be possible that it can be the same kiosk where one pays for a normal parking space fee and now one can also pay for an EV charging fee.

In accordance with one illustrative embodiment of the present invention, a multi-port charging system is provided for charging a rechargeable battery pack that solely propels a plug-in electric vehicle (EV). The system comprises a smart EV charging station including a single network gateway as an entire system communication portion of the multi-port charging system and a single charging system controller as an entire system controller portion of the multi-port charging system. The system further comprises at least two or expandable to greater than two charge ports electrically coupled to the smart EV charging station. Each charge port includes only a charging portion of the multi-port charging system but not a system communication portion and a system controller portion of the multi-port charging system. Each charge port includes a metering circuit to track an amount of electric energy delivered to an EV and collect metered energy data and send the metered energy data back to the smart EV charging station. Each charge port includes one or more EV connection plugs such that each EV connection plug comprises a cable and a connector.

In accordance with one illustrative embodiment of the present invention, a multi-port charging method is provided for charging a rechargeable battery pack that solely propels a plug-in electric vehicle (EV). The method comprises providing a smart EV charging station including a single network gateway as an entire system communication portion of the multi-port charging system and a single charging system controller as an entire system controller portion of the multi-port charging system. The method further comprises providing at least two or expandable to greater than two charge ports electrically coupled to the smart EV charging station. Each charge port includes only a charging portion of the multi-port charging system but not a system communication portion and a system controller portion of the multi-port charging system. Each charge port includes a metering circuit to track an amount of electric energy delivered to an EV and collect metered energy data and send the metered energy data back to the smart EV charging station. Each charge port includes one or more EV connection plugs such that each EV connection plug comprises a cable and a connector.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 10 illustrates a multi-port charging method for charging a rechargeable battery pack that solely propels plug-in electric vehicles (EVs) in accordance with an exemplary embodiment of the present invention.

DETAILED DESCRIPTION

Figure 1:
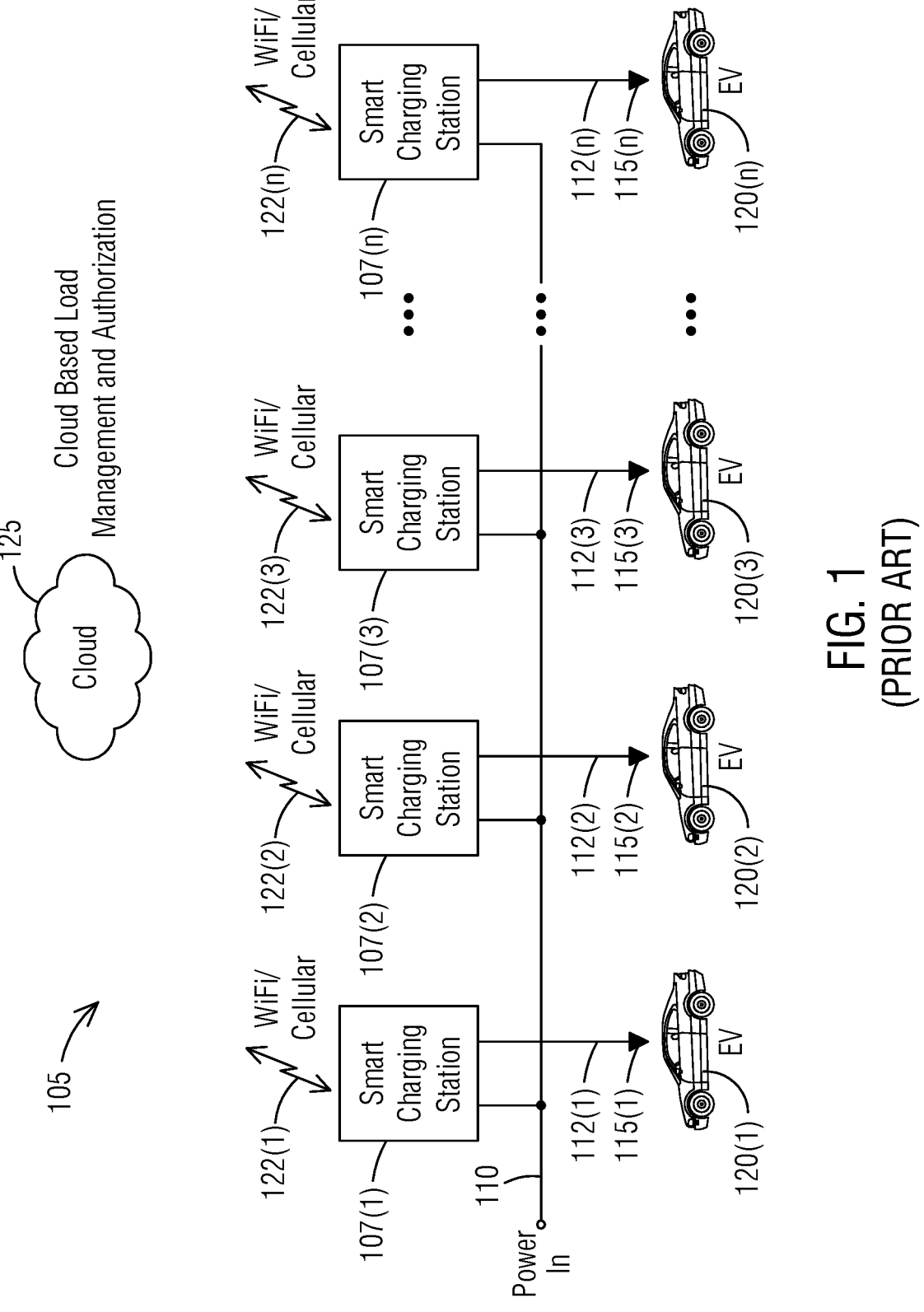
FIG. 1 illustrates a prior art EV charging system.

Various technologies that pertain to systems and methods that facilitate an integrated multi-port electric vehicle (EV) charging system that can control multiple charge ports will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an integrated multi-port electric vehicle (EV) charging system that can control multiple charge ports for charging a rechargeable battery pack that solely propels plug-in electric vehicles (EVs). Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the integrated multi-port electric vehicle (EV) charging system that can control multiple charge ports for charging a rechargeable battery pack that solely propels plug-in electric vehicles (EVs) according to the present disclosure are described below with reference to FIGS. 1-10 herein. Like reference numerals used in the drawings identify similar or identical elements throughout the several views. The drawings are not necessarily drawn to scale.

FIG. 1 illustrates a prior art EV charging system 105 for charging a rechargeable battery pack that solely propels a plug-in electric vehicle (EV) or a plug-in hybrid electric vehicle (PHEV). The charging system 105 comprises a plurality of smart charging stations 107(1-$n$) all powered by a power in line 110. The smart charging stations 107(1-$n$) including a plurality of cables 112(1-$n$) coupled to a corresponding plurality of connectors 115(1-$n$). The smart charging stations 107(1-$n$) are configured to charge a plurality of EVs 120(1-$n$). For example, a parking space in a parking lot may have a smart charging station 107 installed to charge an EV 120. The smart charging stations 107(1-$n$) may be configured to communicate via WiFi/cellular wireless communication links 122(1-$n$) with a cloud 125. In this way, only a cloud-based load management and an authorization to charge may be provided.

Figure 2:
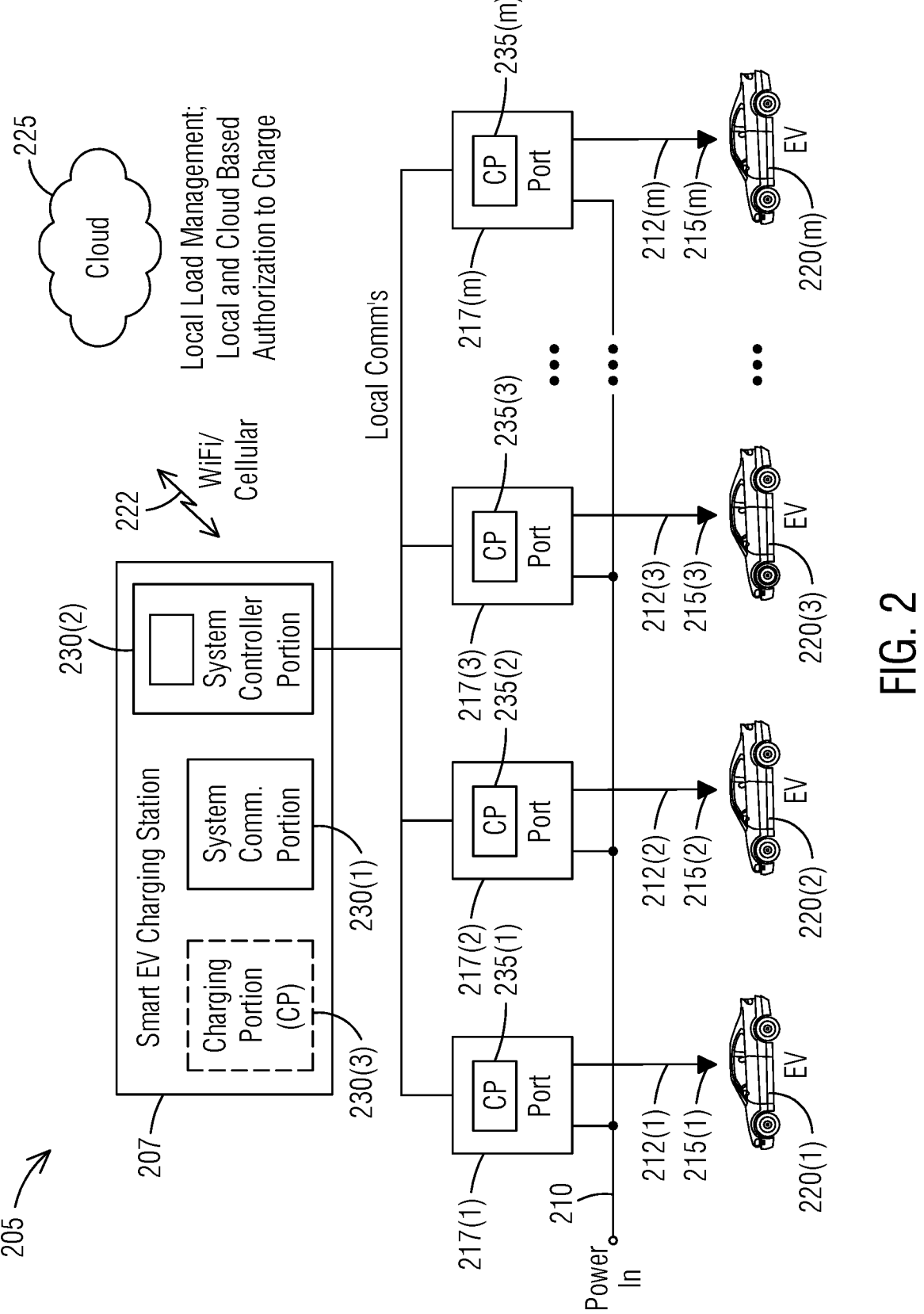
FIG. 2 illustrates an integrated multi-port electric vehicle (EV) charging system in accordance with an exemplary embodiment of the present invention.

Consistent with one embodiment of the present invention, FIG. 2 represents an integrated multi-port electric vehicle (EV) charging system 205 for charging a rechargeable battery pack that solely propels a plug-in electric vehicle (EV) or a plug-in hybrid electric vehicle (PHEV) in accordance with an exemplary embodiment of the present invention. The integrated multi-port electric vehicle (EV) charging system 205 comprises a smart EV charging station 207 powered by a power in line 210 and a plurality of EV charge ports 217(1-$m$) electrically coupled to the smart EV charging station 207. The integrated multi-port electric vehicle (EV)

charging system 205 comprises a system communications portion 230(1), a system controller portion 230(2) and a charging portion (CP) 230(3). The system communications portion 230(1) and the system controller portion 230(2) are provided as part of the smart EV charging station 207. Only the charging portion 230(3) is distributed to each one of the plurality of EV charge ports 217(1-*m*) as a plurality of local CPs 235(1-*m*). In this way, each EV charge port 217 is a low cost version of the smart EV charging station 207 since it does not have any portion of the system communications portion 230(1) and the system controller portion 230(2).

The plurality of EV charge ports 217(1-*m*) including a plurality of cables 212(1-*m*) coupled to a corresponding plurality of connectors 215(1-*m*). The plurality of EV charge ports 217(1-*m*) are configured to charge a plurality of EVs 220(1-*m*). For example, a parking space in a parking lot may have an EV charge port 217 installed to charge a plug-in EV 220. The smart EV charging station 207 may be configured to communicate via a WiFi/cellular wireless communication link 222 with a cloud 225. In this way, both a local based on the plurality of local CPs 235(1-*m*) and a cloud-based load management and an authorization to charge based on the cloud 225 may be provided.

Figure 3:
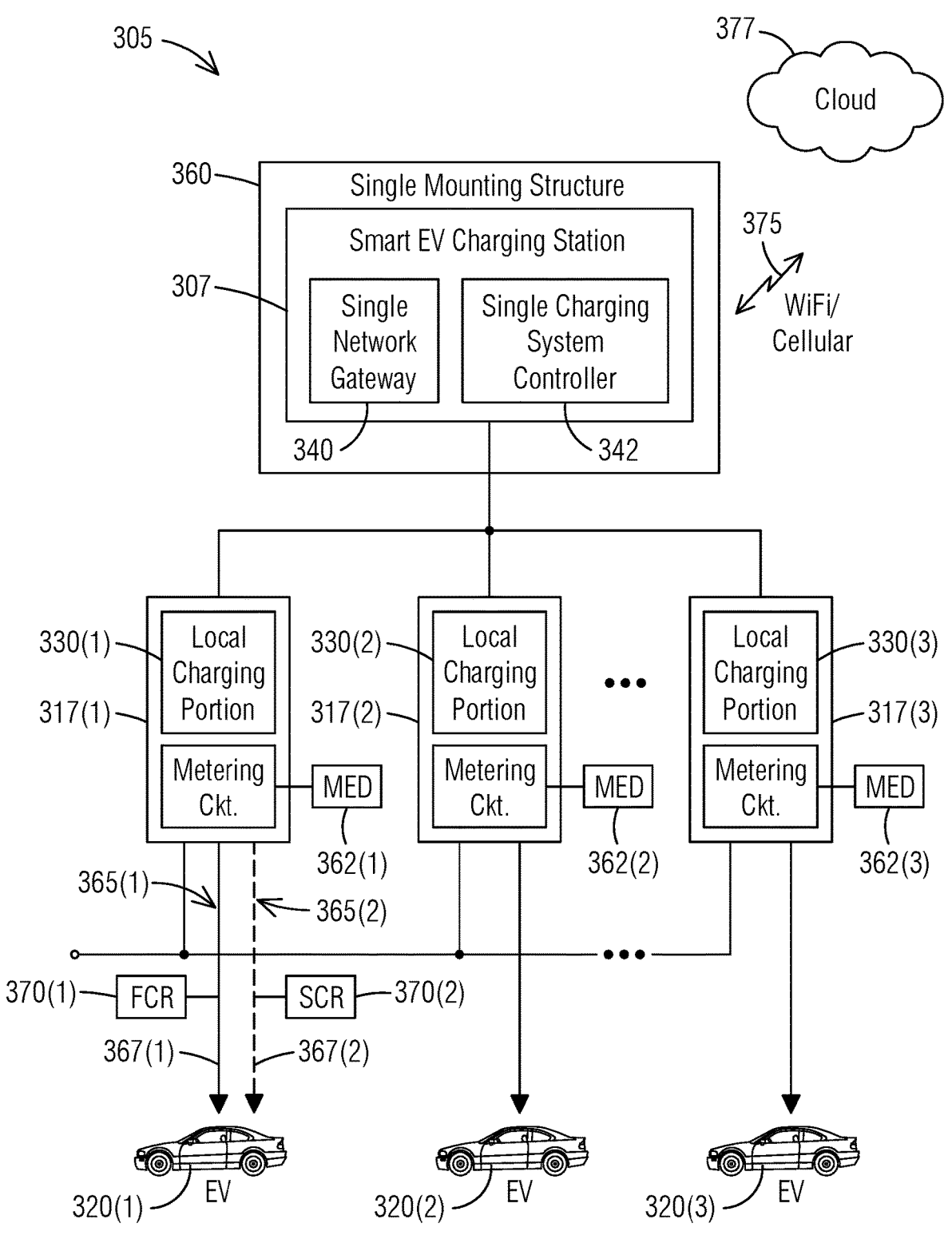
FIG. 3 illustrates a multi-port charging system for charging a rechargeable battery pack that solely propels a plug-in electric vehicle (EV) or a plug-in hybrid electric vehicle (PHEV) in accordance with an exemplary embodiment of the present invention.

Turning now to FIG. 3, it illustrates a multi-port charging system 305 that can control multiple charge ports 317 for charging a rechargeable battery pack that solely propels a plug-in electric vehicle (EV) 320 or a plug-in hybrid electric vehicle (PHEV) in accordance with an exemplary embodiment of the present invention.

The multi-port charging system 305 includes a smart EV charging station 307 that can control at least two or expandable to greater than two charge ports 317(1-2)/317(1-3). The smart EV charging station 307 includes a single network gateway 340 as an entire system communication portion of the multi-port charging system 305 and a single charging system controller 342 as an entire system controller portion of the multi-port charging system 305. The single network gateway 340 simplifies connectivity between the smart EV charging station 307 and the at least two or expandable to greater than two charge ports 317. The single charging system controller 342 monitors at least two or expandable to greater than two charge ports 317(1-2)/317(1-3) and performs load management between all connected charge ports.

At least two or expandable to greater than two charge ports 317(1-2)/317(1-3) are electrically coupled to the smart EV charging station 307. At least two or expandable to greater than two charge ports 317(1-2)/317(1-3) have a modular design that improves flexibility of a multi-port charging solution.

Each charge port 317 includes only a local charging portion (LCP) 330 of local charging portions (LCPs) 330 (1-3) of the multi-port charging system 305 but not a system communication portion and a system controller portion of the multi-port charging system 305. Each charge port 317 includes a metering circuit 350 of metering circuits 350(1-3) of the multi-port charging system 305 to track an amount of electric energy delivered to each EV 320 of a plurality of EVs 320(1-3) and collect metered energy data (MED) 360 (1-3) and send the metered energy data (MED) 360(1-3) back to the smart EV charging station 307. Each charge port 317 includes first and second EV connection plugs 365(1-2) such that each EV connection plug comprises a cable and a connector.

The multi-port charging system 305 further comprises a single mounting structure 360 on which the smart EV charging station 307 is installed as a single charging station. There are several options available to mount the smart EV charging station 307. An existing wall, pole, column, post or pedestal could be used to mount the charging station. Use of existing walls and poles is less expensive than installing a new post or pedestal. Also, mounting on a wall with an existing electrical panel may help to minimize disturbance to existing infrastructure and reduce costs. Alternatively, an overhanging unit can be used to mount the charger overhead. While adding to the cost, this approach would help prolong cord life and minimize trip hazards.

The smart EV charging station 307 should be protected from vehicle collision. This is especially imperative for the side of the smart EV charging station 307 that a vehicle will approach. State laws require protective barriers which include guard posts (bollards), but may also utilize wheel stops, curb protection or wall-mounted bollards, but be mindful that the accessible reach to the device control panel is appropriately maintained.

The smart EV charging station 307 can accommodate two cord sets, although it is possible to have just one cord set on a unit. The availability of at least two cords on the smart EV charging station 307 translates to the ability for two vehicles to be charged simultaneously and at the same or different amperage.

To standardize a statewide EV charging network, charging equipment with payment technology systems that comply with open, non-proprietary communication protocols may be selected. Open communication protocols ensure that the smart EV charging station 307 includes computer hardware for payment systems that can accommodate software from a variety of payment processing services. This means that the smart EV charging station 307 should be able to accept all major credit and debit cards without the need to subscribe to an outside service. Open communication protocols also permit the flexibility of contracting different software and network providers, as may become necessary throughout the life of the charging station.

EV network providers are typically companies that manage a network of public chargers, and provide services to both users and operators, such as equipment maintenance alerts, application-based charger information (available chargers, network maps, etc.), and user support. There are several potential user benefits of networked EV charging station systems. For example, smartphones and internet enabled device applications may feature maps of nearby publicly accessible charging station and provide driving directions to their locations. These applications may also function to reserve a charging session at a chosen EV charging station, to receive email or SMS text message alerts to tell when a charging session is completed or interrupted, and to report a problem with a charging station. Some potential operator benefits of a networked system includes the opportunity to view and download charging history and approximate carbon savings associated with the charging station; the ability to set time-of-day charging options to take advantage of off-peak electricity rates; maintenance reminders and other notification on the charging station's display; and centralize account control for fleet. There are several open protocols being utilized for EV charging today, each with its own capabilities. Different protocols allow for communication between different elements of the EV charging asset chain.

There are several open protocols being utilized for EV charging today, each with its own capabilities. Different protocols allow for communication between different elements of the EV charging asset chain. Open Charge Point Protocol (OCPP) and Open Smart Charge Protocol (OSCP) allow for communications between the smart EV charging station 307 and a charging network administrator. These protocols allow changing network administrators without creating a stranded physical asset. OSCP allows for communication between the EVSE and an energy management system and can be used for smart charging support and load balancing.

The smart EV charging station 307 will need to communicate with the utility grid to measure and meter the amount of electricity being used. It has to bill and track usage of the smart EV charging station 307, however, it is not beneficial to have the smart EV charging station 307 its own separate meter. A separate utility meter, dedicated to the smart EV charging station 307 is not needed. For easier tracking at the charger, the smart EV charging station 307 is equipped with data collection equipment. Equipment usage or tracking software is an additional service which may incur further costs beyond purchasing and installation costs. It will also provide additional information which will better help the owner/operator understand how the smart EV charging station 307 is being utilized There are currently three different levels of charging that can fuel an electric vehicle; Level 1, Level 2 and DC Fast Charging (DCFC). A Level 1 charger requires a low investment in electrical infrastructure and equipment; and can typically be installed through a standard 120-volt household outlet, or by a permanently installed charging station, which is recommended for workplace charging. Level 1 charging provides the slowest rate of charging (3-4 miles per hour) but is well suited for fleets, for example, in a garage where vehicles spend an extended period while not in use. A Level 2 charger utilizes a higher voltage (208-240V) and additional equipment in order to refuel electric vehicles. Level 2 charging can provide between 10 and 60 miles of range per hour of charging; and is better suited for public/visitor charging. Currently, Level 2 chargers represent the most installed EVSE at workplaces where charging is offered, because they create a manageable load for EDCs and meet the needs of most EV drivers at work. DC Fast Charging (DCFC) utilizes high voltages (480-1000V) and can provide 150-1,000 miles of range per charging hour. DCFC has extremely high upfront costs both in expanding electrical infrastructure and installing specialized equipment. While it is the most time-efficient form of charging. DCFC is typically not needed for fleet, employee, or visitor charging, as the majority of users will be at the facility for a while, if not an entire work day, allowing them the opportunity to get a complete charge from a level 1 or 2 charger.

Recharging at a public charging station requires drivers to first determine the compatibility of their EV with the charging station's available connector or connectors. Currently, the most used plug-in connector is the SAE J1772, which is the standard connection for Level 1 and Level 2 charging and is supported by all major vehicle manufacturers and charging system manufacturers. This standardized connector makes virtually every EV compatible with every non-fast charging station. A standardized connector compatible with all EVs for DCFCs has yet to materialize. Most of the DCFC capable EVs are compatible with at least one of three commonly available connectors. The two most used connectors for DCFCs are CHAdeMO and SAE Combined Charging System (CCS). CHAdeMO is the standard connector for Japanese auto manufacturers, and CCS is the standard connector for American and European automakers. To note, the CHAdeMO connector is currently being phased out in the US and may be less relevant for newer fleet models. Although, it will be still be necessary for the charging of older or used EV models. Tesla, the third available connector, uses its own proprietary connector; limiting its use only to Tesla vehicles. However, using adapters, Tesla vehicles can also be charged at non-Tesla DCFC stations.

States do not impose requirement for public EVSE to have multiple types of connectors available; however, it is likely that most public, for-profit EVSE will offer multiple connection options in order to maximize their potential customer base. Until an industry-wide standard connector is established, all publicly funded, publicly available DCFC station sites should have both CHAdeMO and CCS connections available for use.

There are three fundamental needs when it comes to powering EVSE: A dedicated circuit for each EVSE unit on the electrical panel, ample electrical capacity from the utility connection to the electrical panel, and sufficient electrical capacity from the electrical panel itself. Complexity of charging station installation and a need for electrical upgrades in any of these areas may increase installation costs.

Site preparation costs associated with cutting, trenching and drilling can be significant, therefore, the greater the distance between the power source and the EV charging station, the higher the installation costs are likely to be. Care should be given to select a location where it is as inexpensive as possible to provide AC Level 1 (120V) or 2 (240V) electrical supply.

Each charge port of at least two or expandable to greater than two charge ports 317 support multiple global EV connection plugs 365(1-2). Each charge port of at least two or expandable to greater than two charge ports 317 is an individually metered charge port for simplicity. A charge port 317 of at least two or expandable to greater than two charge ports 317 supports a first EV connection plug 365(1) with a first cable 367(1) of a first current rating (FCR) 370(1) and a second EV connection plug 365(2) with a second cable 367(2) of a second current rating 370(2) being same or different from the first current rating 370(1).

The smart EV charging station 307 may be configured to communicate via a WiFi/cellular wireless communication link 375 with a cloud 377 such that a local and a cloud-based load management may be provided. The smart EV charging station 307 may be configured to communicate via the WiFi/cellular wireless communication link 375 with the cloud 377 such that a local and a cloud-based authorization to charge may be provided.

Figure 4:
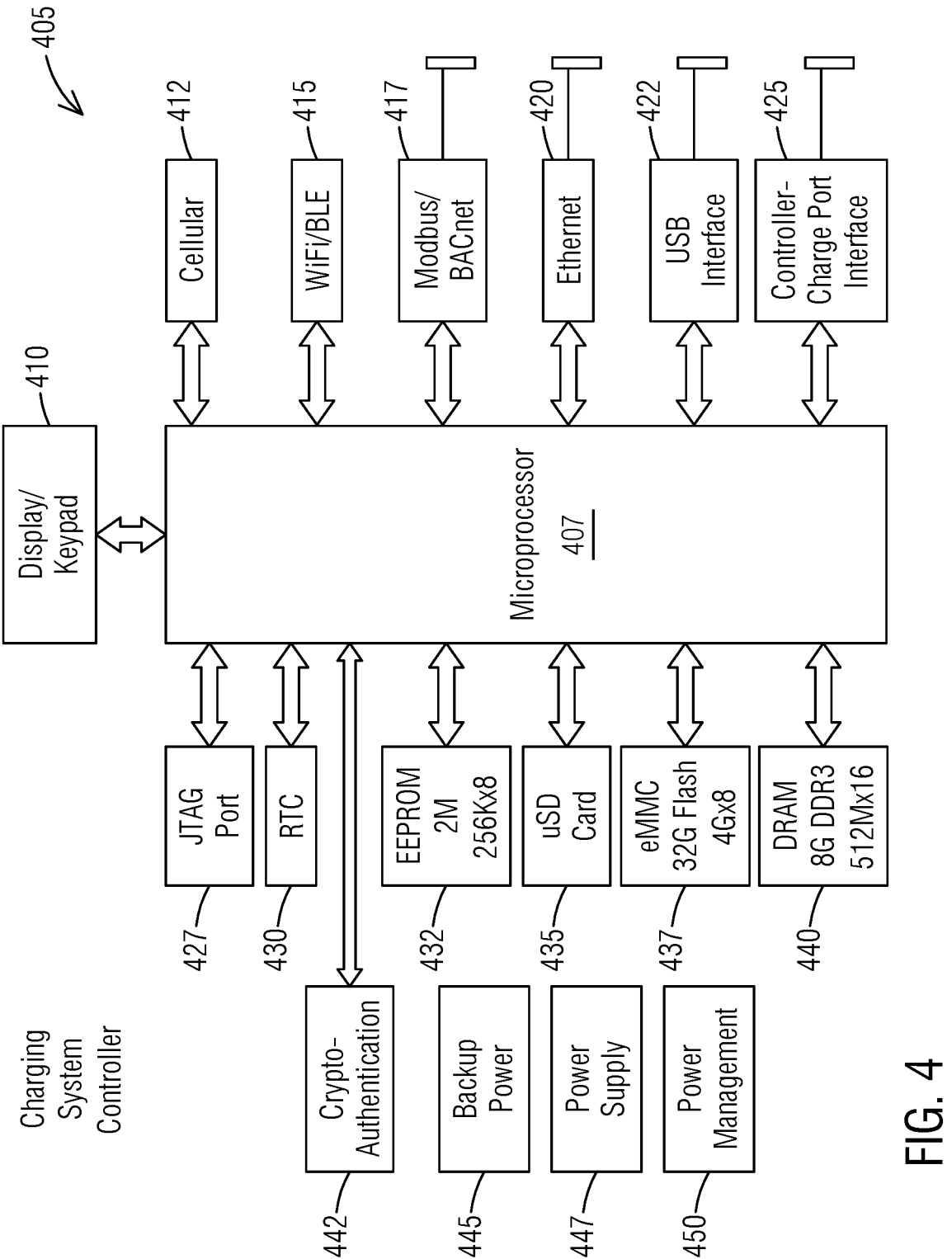
FIG. 4 illustrates a charging system controller in accordance with an exemplary embodiment of the present invention.

FIG. 4 illustrates a charging system controller 405 in accordance with an exemplary embodiment of the present invention. The charging system controller 405 includes a microprocessor 407 configured to operate and control the charging system controller 405. It is coupled to a display/keypad 410 that is capable of displaying information and receiving a user input. The charging system controller 405 further includes a cellular function 412, a WiFi/Bluetooth Low Energy (BLE) function 415, a Modbus/Building Automation and Control (BAC) networks (BACnet) function 417, an Ethernet function 420, a USB interface 422 and a controller-charge port interface 425. The charging system controller 405 further includes a JTAG port 427, a RTC 430, an EEPROM 432, a uSD card 435, an eMMC 437, a DRAM 440 and a crypto authentication 442. The charging system controller 405 further includes a backup power 445, a power supply 447 and a power management 450.

Figure 5:
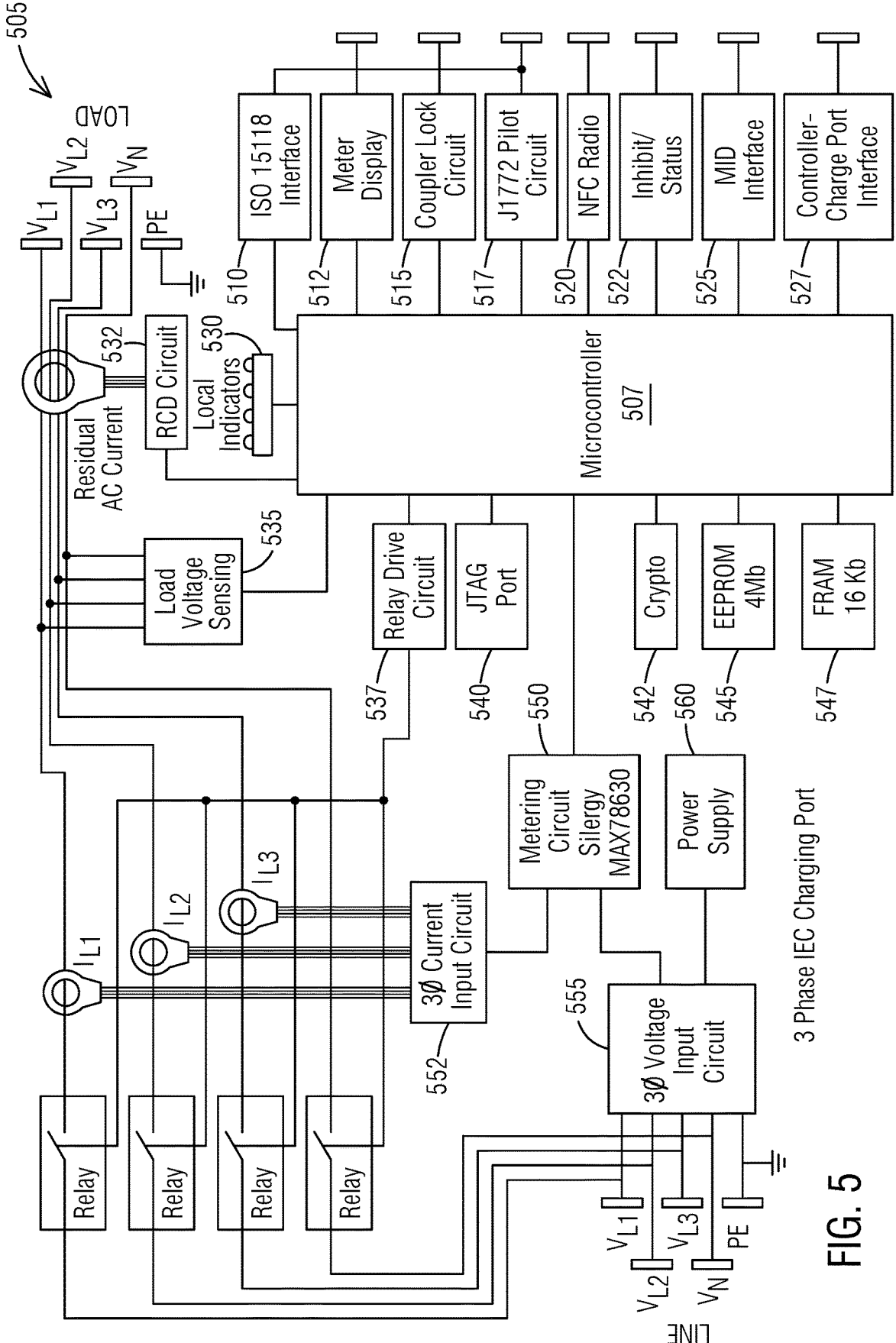
FIG. 5 illustrates a 3-phase International Electrotechnical Commission (IEC) charging port in accordance with an exemplary embodiment of the present invention.

As seen in FIG. 5, it illustrates a 3-phase International Electrotechnical Commission (IEC) charging port 505 (230V, 48 A) in accordance with an exemplary embodiment of the present invention. The 3-phase IEC charging port 505 includes a microcontroller 507. It is coupled to an ISO 15118 interface 510, a meter display 512, a coupler lock circuit 515, a J1772 pilot circuit 517, an NFC radio 520, an inhibit/status 522, a MID interface 525 and a controller-charge port interface 527. The 3-phase IEC charging port 505 further includes a plurality of local indicators 530, a RCD circuit 532, a load voltage sensing 535, a relay drive circuit 537, a JTAG port 540, a crypto 542, an EEPROM 545, a FRAM 547 and a metering circuit 550. The metering circuit 550 is coupled to a 3 ph current input circuit 552 and a 3 ph voltage input circuit 555 which is coupled to a power supply 560.

Figure 6:
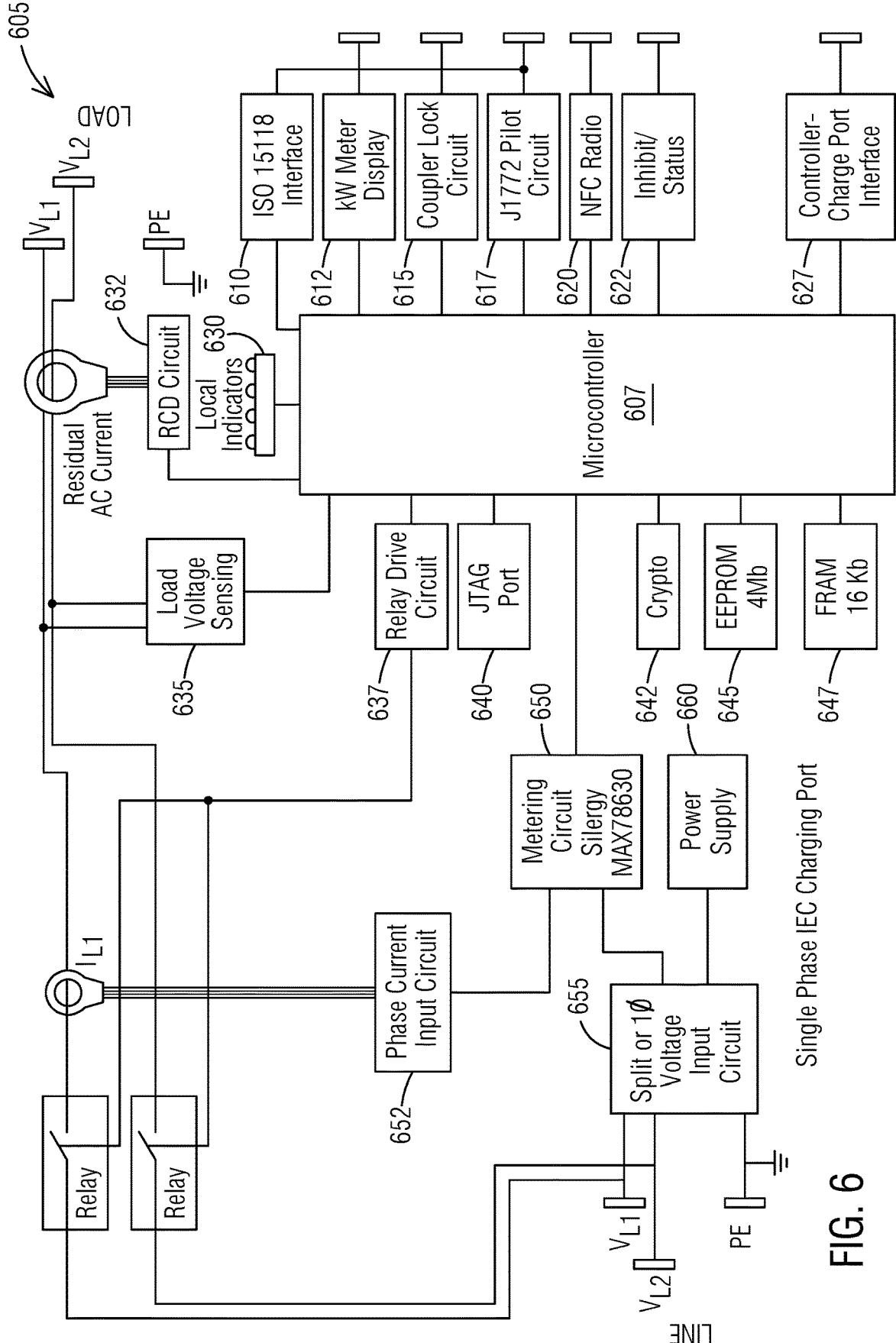
FIG. 6 illustrates a single-phase International Electrotechnical Commission (IEC) charging port in accordance with an exemplary embodiment of the present invention.

As shown in FIG. 6, it illustrates a single-phase International Electrotechnical Commission (IEC) charging port 605 (230V, 80/48 A) in accordance with an exemplary embodiment of the present invention. The single-phase IEC charging port 605 includes a microcontroller 607. It is coupled to an ISO 15118 interface 610, a kW meter display 612, a coupler lock circuit 615, a J1772 pilot circuit 617, an NFC radio 620, an inhibit/status 622 and a controller-charge port interface 627. The single-phase IEC charging port 505 further includes a plurality of local indicators 630, a RCD circuit 632, a load voltage sensing 635, a relay drive circuit 637, a JTAG port 640, a crypto 642, an EEPROM 645, a FRAM 647 and a metering circuit 650. The metering circuit 650 is coupled to a phase current input circuit 652 and a split or 1-ph voltage input circuit 655 which is coupled to a power supply 660.

Figure 7:
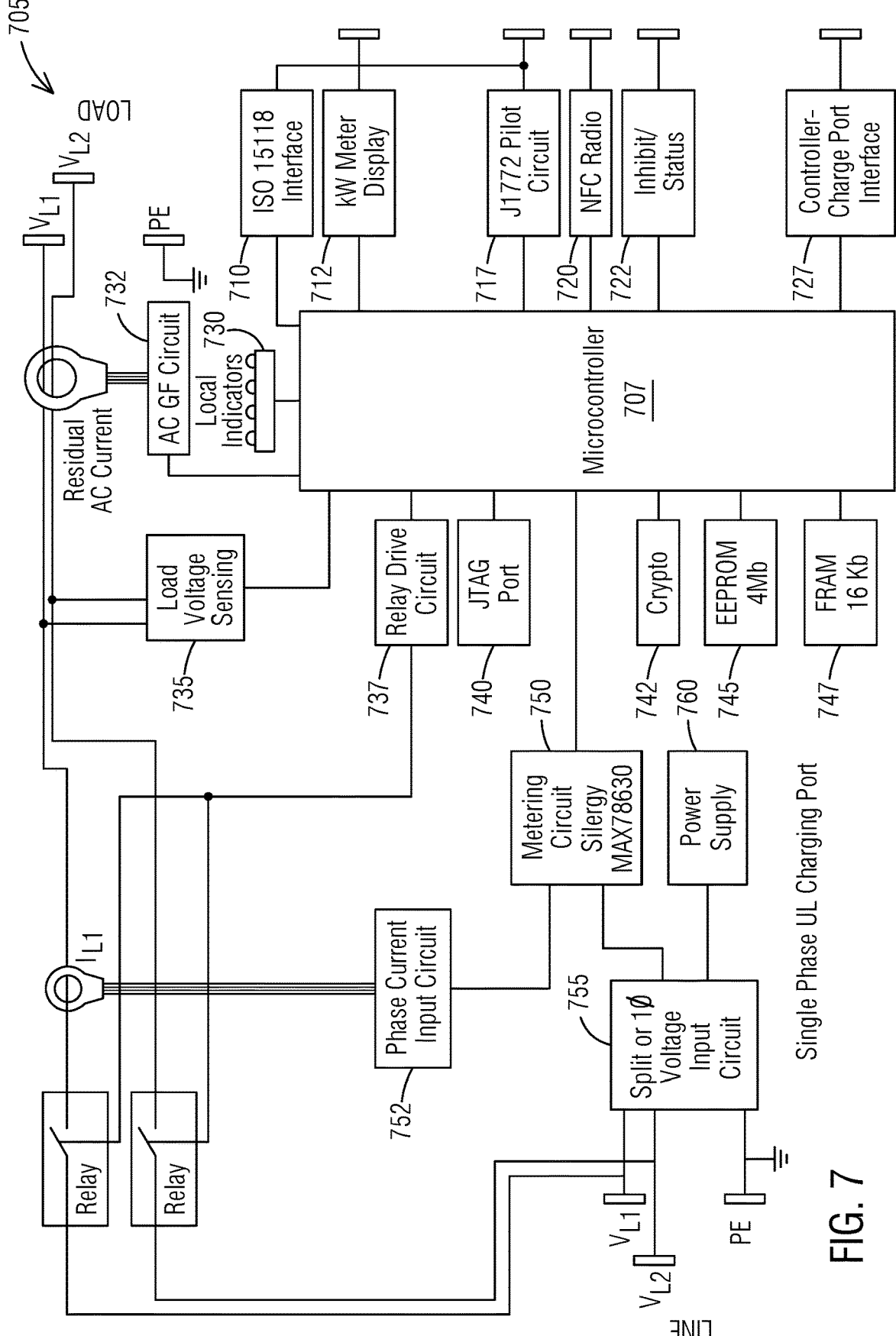
FIG. 7 illustrates a single-phase Underwriters' Laboratories (UL) charging port in accordance with an exemplary embodiment of the present invention.

In FIG. 7, it illustrates a single-phase Underwriters' Laboratories (UL) charging port 705 (240/208V, 80/48 A) in accordance with an exemplary embodiment of the present invention. The single-phase UL charging port 705 includes a microcontroller 707. It is coupled to an ISO 15118 interface 710, a kW meter display 712, a J1772 pilot circuit 717, an NFC radio 720, an inhibit/status 722 and a controller-charge port interface 727. The single-phase UL charging port 705 further includes a plurality of local indicators 730, an AC GF circuit 732, a load voltage sensing 735, a relay drive circuit 737, a JTAG port 740, a crypto 742, an EEPROM 745, a FRAM 747 and a metering circuit 750. The metering circuit 750 is coupled to a phase current input circuit 752 and a split or 1-ph voltage input circuit 755 which is coupled to a power supply 760.

Figure 8:
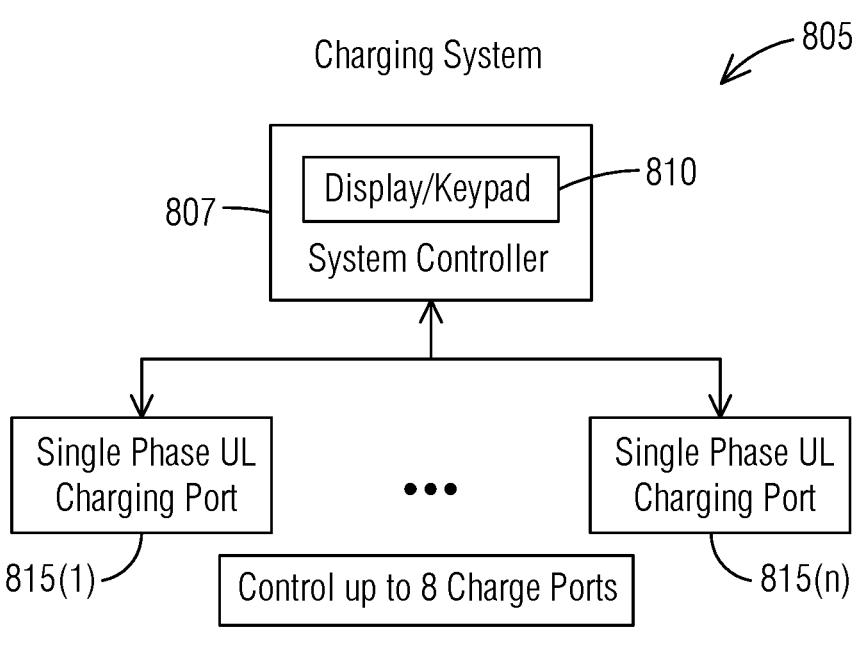
FIG. 8 illustrates a first multi-port electric vehicle (EV) charging system that can control up to 8 charge ports in accordance with one embodiment of the present invention.

With regard to FIG. 8, it illustrates a first multi-port electric vehicle (EV) charging system 805 that can control up to 8 charge ports in accordance with one embodiment of the present invention. The charging system 805 comprises a system controller 807 with a display/keyboard 810. The system controller 807 is coupled to a plurality of single-phase UL charging ports 815(1-*n*).

Figure 9:
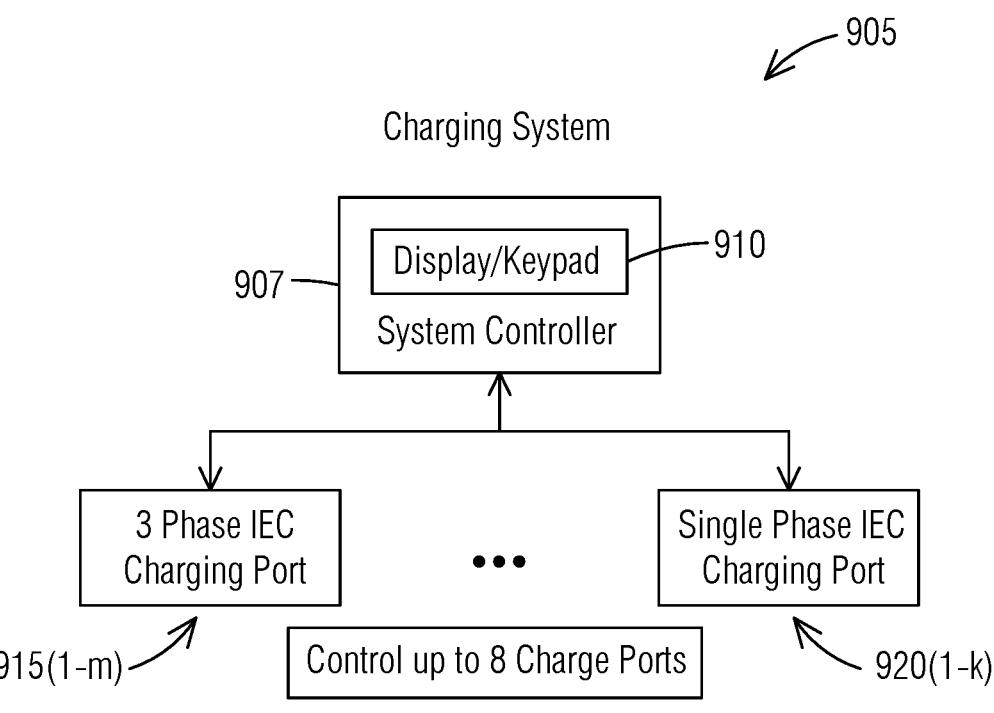
FIG. 9 illustrates a second multi-port electric vehicle (EV) charging system that can control up to 8 charge ports in accordance with another embodiment of the present invention.

With respect to FIG. 9, it illustrates a second multi-port electric vehicle (EV) charging system 905 that can control up to 8 charge ports in accordance with another embodiment of the present invention. The charging system 905 comprises a system controller 907 with a display/keyboard 910. The system controller 907 is coupled to a combination of a plurality of 3-phase UL charging ports 915(1-*m*) and a plurality of single-phase UL charging ports 920(1-*k*).

FIG. 10 illustrates a multi-port charging method 1000 for charging a rechargeable battery pack that solely propels plug-in electric vehicles (EVs) in accordance with an exemplary embodiment of the present invention. Reference is made to the elements and features described in FIGS. 1-9. It should be appreciated that some steps are not required to be performed in any particular order, and that some steps are optional.

The method 1000 comprises a step 1005 of providing a smart EV charging station including a single network gateway as an entire system communication portion of the multi-port charging system and a single charging system controller as an entire system controller portion of the multi-port charging system. The method 1000 further comprises a step 1010 of providing at least two or expandable to greater than two charge ports electrically coupled to the smart EV charging station.

Each charge port includes only a charging portion of the multi-port charging system but not a system communication portion and a system controller portion of the multi-port charging system. Each charge port includes a metering circuit to track an amount of electric energy delivered to an EV and collect metered energy data and send the metered energy data back to the smart EV charging station. Each charge port includes one or more EV connection plugs such that each EV connection plug comprises a cable and a connector.

While a design of a combination of a single smart charging station and a plurality of charge ports as degraded charging stations is described here a range of one or more other charge ports are also contemplated by the present invention. For example, other charge ports may be implemented based on one or more features presented above without deviating from the spirit of the present invention.

The techniques described herein can be particularly useful for a low cost charge port with multiple EV connection plugs with different current rating cables and a same connector. While particular embodiments are described in terms of this arrangement, the techniques described herein are not limited to such an arrangement but can also be used with other arrangements such as different connectors.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment." or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A multi-port charging system for charging a rechargeable battery pack that solely propels a plug-in electric vehicle (EV), the system comprising:
   a smart EV charging station including a single network gateway as an entire system communication portion of the multi-port charging system and a single charging system controller as an entire system controller portion of the multi-port charging system;
   at least two or expandable to greater than two charge ports electrically coupled to the smart EV charging station,
   wherein each charge port includes only a charging portion of the multi-port charging system but not a system communication portion and a system controller portion of the multi-port charging system,
   wherein each charge port includes a metering circuit to track an amount of electric energy delivered to the plug-in EV and collect metered energy data and send the metered energy data back to the smart EV charging station, and
   wherein each charge port includes one or more EV connection plugs such that each EV connection plug comprises a cable and a connector.

2. The multi-port charging system of claim 1, further comprising:
   a single mounting structure on which the smart EV charging station as a single charging station.

3. The multi-port charging system of claim 1, wherein the single network gateway simplifies connectivity between the smart EV charging station and the at least two or expandable to greater than two charge ports.

4. The multi-port charging system of claim 1, wherein the at least two or expandable to greater than two charge ports have a modular design that improves flexibility of a multi-port charging solution.

5. The multi-port charging system of claim 1, wherein the single charging system controller monitors the at least two or expandable to greater than two charge ports and performs load management between all connected charge ports.

6. The multi-port charging system of claim 1, wherein each charge port of the at least two or expandable to greater than two charge ports support multiple global EV connection plugs.

7. The multi-port charging system of claim 1, wherein each charge port of the at least two or expandable to greater than two charge ports is an individually metered charge port for simplicity.

8. The multi-port charging system of claim 1, wherein a charge port of the at least two or expandable to greater than two charge ports supports a first EV connection plug with a first cable of a first current rating and a second EV connection plug with a second cable of a second current rating being same or different from the first current rating.

9. The multi-port charging system of claim 8, wherein the smart EV charging station may be configured to communicate via a Wi-Fi/cellular wireless communication link with a cloud such that a local and a cloud-based load management may be provided.

10. The multi-port charging system of claim 9, wherein the smart EV charging station may be configured to communicate via the Wi-Fi/cellular wireless communication link with the cloud such that a local and a cloud-based authorization to charge may be provided.

11. A multi-port charging method for charging a rechargeable battery pack that solely propels a plug-in electric vehicle (EV), the method comprising:

provising a smart EV charging station including a single network gateway as an entire system communication portion of the multi-port charging system and a single charging system controller as an entire system controller portion of the multi-port charging system;

providing at least two or expandable to greater than two charge ports electrically coupled to the smart EV charging station, wherein each charge port includes only a charging portion of the multi-port charging system but not a system communication portion and a system controller portion of the multi-port charging system, wherein each charge port includes a metering circuit to track an amount of electric energy delivered to the plug-in EV and collect metered energy data and send the metered energy data back to the smart EV charging station, and wherein each charge port includes one or more EV connection plugs such that each EV connection plug comprises a cable and a connector.

12. The method of claim 11, further comprising:

providing a single mounting structure on which the smart EV charging station as a single charging station.

13. The method of claim 11, wherein the single network gateway simplifies connectivity between the smart EV charging station and the at least two or expandable to greater than two charge ports.

14. The method of claim 11, wherein the at least two or expandable to greater than two charge ports have a modular design that improves flexibility of a multi-port charging solution.

15. The method of claim 11, wherein the single charging system controller monitors the at least two or expandable to greater than two charge ports and performs load management between all connected charge ports.

16. The method of claim 11, wherein each charge port of the at least two or expandable to greater than two charge ports support multiple global EV connection plugs.

17. The method of claim 11, wherein each charge port of the at least two or expandable to greater than two charge ports is an individually metered charge port for simplicity.

18. The method of claim 11, wherein a charge port of the at least two or expandable to greater than two charge ports supports a first EV connection plug with a first cable of a first current rating and a second EV connection plug with a second cable of a second current rating being same or different from the first current rating.

19. The method of claim 18, wherein the smart EV charging station may be configured to communicate via a Wi-Fi/cellular wireless communication link with a cloud such that a local and a cloud-based load management may be provided.

20. The method of claim 19, wherein the smart EV charging station may be configured to communicate via the Wi-Fi/cellular wireless communication link with the cloud such that a local and a cloud-based authorization to charge may be provided.

* * * * *